US009691078B2

(12) United States Patent
Matthews et al.

(10) Patent No.: US 9,691,078 B2
(45) Date of Patent: Jun. 27, 2017

(54) SYSTEM FOR INCENTIVIZING CHARITABLE GIVING BASED ON PHYSICAL ACTIVITY AND A METHOD OF USING THE SAME (71) Applicant: Uncharted Play, Inc., New York, NY (US)

(72) Inventors: Jessica Osemudiamen Matthews, Poughkeepsie, NY (US); Victor Angel Mosti, Brooklyn, NY (US); Melissa K. Seligmann, New York, NY (US)

(73) Assignee: Uncharted Play, Inc., New York, NY (US)

( * ) Notice: Subject to any disclaimer, the term of this patent is extended or adjusted under 35 U.S.C. 154(b) by 690 days.

(21) Appl. No.: 14/034,134

(22) Filed: Sep. 23, 2013

(65) Prior Publication Data
US 2014/0089069 A1  Mar. 27, 2014

Related U.S. Application Data (60) Provisional application No. 61/704,196, filed on Sep. 21, 2012.

(51) Int. Cl.
*G06Q 30/02* (2012.01)
(52) U.S. Cl.
CPC ......... *G06Q 30/0217* (2013.01); *G06Q 30/02* (2013.01); *G06Q 30/0279* (2013.01)
(58) Field of Classification Search
CPC .............................................. G06Q 30/0217
See application file for complete search history.

(56) References Cited

U.S. PATENT DOCUMENTS

| 248,010 | A | 10/1881 | Berney |
| 2,942,807 | A | 6/1960 | Gallagher |
| 4,248,010 | A | 2/1981 | Fox |
| 5,167,082 | A | 12/1992 | Chen |

(Continued)

FOREIGN PATENT DOCUMENTS

GB    2308309 A    6/1997

OTHER PUBLICATIONS

International search report and written opinion dated Oct. 26, 2012 for PCT Application No. US-2012049355.

(Continued)

*Primary Examiner* — Jacob C. Coppola
(74) *Attorney, Agent, or Firm* — Wilson, Sonsini, Goodrich & Rosati (57) ABSTRACT A system and method for incentivizing charitable giving based on physical activity includes a computer and a sports ball associated with a first participant identifier. The sports ball includes a sensor that detects and logs activity data. The activity data is received by the computer, and in further transmitted to a server. The server stores the received activity data in a participant record associated with the first participant identifier and assigns a plurality of credits to the participant record associated with the first participant identifier based on the activity data stored in the participant record. Software executing on the server generates a report based on the credits assigned to the participant record associated with the first participant identifier and transmits the report to a participant computer associated with the first participant identifier.

9 Claims, 8 Drawing Sheets

(56) References Cited

U.S. PATENT DOCUMENTS

| | | | |
|---|---|---|---|
| 5,228,686 A | 7/1993 | Maleyko | |
| 5,375,839 A * | 12/1994 | Pagani | A63B 43/00 446/409 |
| 5,558,325 A | 9/1996 | Hargis et al. | |
| 6,117,030 A | 9/2000 | Green, Sr. | |
| 6,265,984 B1 | 7/2001 | Molinaroli | |
| 6,404,409 B1 | 6/2002 | Solomon | |
| 6,433,465 B1 | 8/2002 | McKnight et al. | |
| 6,572,492 B2 | 6/2003 | Tinsman | |
| 6,634,959 B2 | 10/2003 | Kuesters | |
| 6,893,141 B2 | 5/2005 | Mah | |
| 6,894,460 B2 | 5/2005 | Clingman | |
| 7,224,086 B2 | 5/2007 | Germagian et al. | |
| 7,234,351 B2 | 6/2007 | Perkins | |
| 7,789,742 B1 * | 9/2010 | Murdock | A63B 24/0021 273/108 |
| 7,847,421 B2 | 12/2010 | Gardner et al. | |
| 8,332,544 B1 * | 12/2012 | Ralls | A63F 13/12 340/573.1 |
| 8,517,899 B2 | 8/2013 | Zhou et al. | |
| 9,517,388 B2 | 12/2016 | Idoni-Matthews et al. | |
| 2002/0094893 A1 * | 7/2002 | Takowski | A63B 67/002 473/570 |
| 2002/0173378 A1 * | 11/2002 | Tinsman | A63B 24/0021 473/351 |
| 2003/0137274 A1 | 7/2003 | Sastry | |
| 2004/0218383 A1 | 11/2004 | Bailey | |
| 2006/0232233 A1 | 10/2006 | Adams et al. | |
| 2007/0046251 A1 | 3/2007 | Chi-Hsueh | |
| 2007/0129220 A1 | 6/2007 | Bardha | |
| 2007/0138793 A1 | 6/2007 | Zimmerman et al. | |
| 2008/0097644 A1 | 4/2008 | Kaznov et al. | |
| 2008/0106149 A1 | 5/2008 | Yen | |
| 2008/0174281 A1 | 7/2008 | Shau | |
| 2009/0029754 A1 * | 1/2009 | Slocum | A63B 24/0087 463/5 |
| 2009/0127856 A1 | 5/2009 | Hench | |
| 2009/0150178 A1 * | 6/2009 | Sutton | G07C 1/22 705/2 |
| 2010/0090477 A1 | 4/2010 | Keating et al. | |
| 2010/0130314 A1 | 5/2010 | Von Der Gruen et al. | |
| 2010/0167850 A1 | 7/2010 | Lin | |
| 2011/0136603 A1 * | 6/2011 | Lin | A63B 43/00 473/570 |
| 2011/0191158 A1 * | 8/2011 | Kateraas | G06F 19/3418 705/14.27 |
| 2011/0193350 A1 | 8/2011 | Rastegar et al. | |
| 2011/0250939 A1 * | 10/2011 | Hobler | A63B 57/00 463/7 |
| 2011/0264521 A1 * | 10/2011 | Straka | G06Q 30/02 705/14.49 |
| 2012/0025531 A1 | 2/2012 | Montgomery et al. | |
| 2012/0133148 A1 | 5/2012 | Romeo | |
| 2012/0181989 A1 | 7/2012 | Li et al. | |
| 2012/0197815 A1 * | 8/2012 | Cameron | G06Q 30/0279 705/329 |
| 2012/0244969 A1 * | 9/2012 | Binder | A63H 33/18 473/570 |
| 2013/0023365 A1 * | 1/2013 | Idoni-Matthews | A63B 43/00 473/570 |
| 2013/0073368 A1 * | 3/2013 | Squires | G06Q 30/0269 705/14.26 |
| 2013/0288860 A1 | 10/2013 | Massey | |
| 2013/0324367 A1 | 12/2013 | Lam | |
| 2015/0005137 A1 | 1/2015 | Matthews et al. | |
| 2015/0065301 A1 | 3/2015 | Oteman | |
| 2015/0262262 A1 * | 9/2015 | Carvajal | G06Q 30/0279 705/26.1 |
| 2015/0290490 A1 | 10/2015 | Badarneh | |
| 2016/0001136 A1 * | 1/2016 | King | A63B 69/0071 320/108 |
| 2016/0038793 A1 | 2/2016 | Kikel | |
| 2016/0067537 A1 | 3/2016 | Bayerlein et al. | |

OTHER PUBLICATIONS

Notice of allowance dated Aug. 1, 2016 for U.S. Appl. No. 13/565,474.
Office action dated Jan. 6, 2017 for U.S. Appl. No. 14/490,271.
Office action dated Jan. 28, 2015 for U.S. Appl. No. 13/565,474.
Office action dated Feb. 24, 2016 for U.S. Appl. No. 13/565,474.
Office action dated Jun. 8, 2016 for U.S. Appl. No. 14/490,271.
Office action dated Aug. 10, 2015 for U.S. Appl. No. 13/565,474.
Office action dated Sep. 26, 2016 for U.S. Appl. No. 14/490,271.

* cited by examiner

SYSTEM FOR INCENTIVIZING CHARITABLE GIVING BASED ON PHYSICAL ACTIVITY AND A METHOD OF USING THE SAME

CROSS-REFERENCE

This application claims the benefit of U.S Provisional Application Ser. No. 61/704,196, filed Sep. 21, 2012, which is entirely incorporated herein by reference.

FIELD OF THE INVENTION

The invention relates to collecting and distributing charitable donations. In particular, the present invention relates to a system and method for tracking physical activity and assigning credits based on the amount of physical activity, the credits being redeemable for charitable donations.

BACKGROUND OF THE INVENTION

Soliciting, making, and receiving charitable donations are important, are becoming ever more important as government resources allocated to charitable causes is decreases. At the same time, there is a growing need for such support.

There are a many different system and methods that facilitate charitable giving. For example, a person may donate a portion of their personal assets to a cause or charitable entity of their choosing. In another known method, a person may solicit funds from third parties for a specific charitable cause, for example building a new hospitable. Sometimes, such donors will pledge donations based on the completion of a goal, for example running a marathon.

SUMMARY OF THE INVENTION

The present invention resides in one aspect in a system for incentivizing charitable giving based on physical activity. The system includes a server having software executing thereon that receives activity data indicative of an amount of physical activity. The received activity data has a first participant identifier associated therewith. The system is in communication with a database that comprises a plurality of participant records. Each participant record has a participant identifier associated therewith. Software executing on the server stores the received activity data in the participant record associated with the first participant identifier. Software executing on the server assigns a plurality of credits to the participant record associated with the first participant identifier based on the activity data stored in the participant record associated with the first participant identifier. Software executing on the server generates a report based on the credits assigned to the participant record associated with the first participant identifier. The server has a communication link with the internet. Software executing on the server transmits the report to a participant computer associated with the first participant identifier via the communication link.

In one embodiment of the present invention, the activity data is indicative of a use of a sports ball associated with the first participant identifier.

In yet another embodiment of the present invention, the sports ball includes a sensor that is configured to detect an acceleration of the sports ball, the acceleration being indicative of the use of the sports ball.

In yet another embodiment of the present invention, the activity data received by the server is indicative of a duration of the use of the sports ball.

In yet another aspect of the present invention, the report generated by the software executing on the server identifies the duration of the use of the sports ball associated with the first participant identifier and further identifies a number of credits earned for the duration of the use of the sports ball.

In yet another embodiment of the present invention, software executing on the server generates a charitable donation response form. The form identifies at least one charitable donation option that is redeemable for a predetermined number of credits. The server further includes software executing thereon for receiving a reply to the charitable donation form.

In yet other embodiments of the present invention, the report generated by the server includes a rank associated with the first participant identifier. The rank is indicative of the duration of use with the sports ball associated with the first participant identifier relative to the duration of use of sports balls associated with one or more other participant identifiers.

The present invention resides in another aspect in a system for incentivizing charitable giving based on physical activity. The system includes a computer associated with a first participant identifier. The computer has a communication link to the internet. The system further includes a sports ball associated with the first participant identifier. The sports ball includes a sensor for detecting an acceleration of the sports ball. A processor is in communication with the sensor, and software executing on the processor receives signals from the sensor indicative of the acceleration of the sports ball. Software executing on the processor determines activity data based on the signals received from the sensor. The system includes a communication link between the sports ball and the computer. Software executing on the computer associated with the first participant identifier transmits the first participant activity data via the communication link with the internet. The system further includes a server having software executing thereon. Software executing on the server receives the activity data indicative of an amount of physical activity. The received activity data has a first participant identifier associated therewith. The system is in communication with a database that comprises a plurality of participant records. Each participant record has a participant identifier associated therewith. Software executing on the server stores the received activity data in the participant record associated with the first participant identifier. Software executing on the server assigns a plurality of credits to the participant record associated with the first participant identifier based on the activity data stored in the participant record associated with the first participant identifier. Software executing on the server generates a report based on the credits assigned to the participant record associated with the first participant identifier. The server has a communication link with the internet. Software executing on the server transmits the report to a participant computer associated with the first participant identifier via the communication link.

In one embodiment of the present invention, the activity data is indicative of a duration of the use of a sports ball associated with the first participant identifier.

In yet another embodiment of the present invention, the sports ball includes a sensor that is configured to detect an acceleration of the sports ball, the acceleration being indicative of use of the sports ball.

In yet another embodiment of the present invention, software executing on the server generates a charitable donation response form. The form identifies at least one charitable donation option that is redeemable for a predetermined number of credits. The server further includes software executing thereon for receiving a reply to the charitable donation form.

In yet another embodiment of the present invention, the system includes software executing on the server for subtracting a number of credits corresponding to the predetermined number of credits from the credits associated with the participant record associated with the first participant identifier in response a selection of a donation option.

In yet another embodiment of the present invention, the system includes software executing on the server for generating a donation redemption form that includes a confirmation that the donation has been redeemed.

In yet one embodiment of the present invention, the sensor comprises a piezoelectric component that generates an electrical current in response to an acceleration of the sports ball.

In yet another embodiment of the present invention, the ball includes a shell defining a spheroid, the shell defining a cavity. The shell defines a first opening and a second opening substantially diametrically opposite the first opening. A first panel is configured to substantially close the first opening. The first panel has a sleeve that extends radially inward from an inner surface of the first panel. A second panel is configured to substantially close the second opening. The second panel has a sleeve that extends radially inward from an inner surface of the second panel. The sensor and the processor are supported in a center of the sphere by a distal end of the first sleeve and a distal end of the second sleeve.

In yet another embodiment of the present invention, the ball further includes a foam ring disposed therein between the distal end of the first sleeve and the distal end of the second sleeve. The foam ring is configured to further support the sensor and the processor, and is further configured to increase the rigidity of the shell.

In yet another embodiment of the present invention, the sports ball further includes an electric generator and a battery disposed therein. A rotor of the electric generator is mechanically coupled to the pendulum at a first axis of rotation of the pendulum. The electric generator is electrically coupled to the battery. An acceleration of the ball relative to a playing surface causes the pendulum to rotate about the first axis of rotation. The rotation of the pendulum rotates the electric generator which generates electrical energy at least a portion of which is stored by the battery.

The invention and its particular features and advantages will become more apparent from the following detailed description considered with reference to the accompanying drawings.

BRIEF DESCRIPTION OF THE DRAWINGS

FIG. 4 illustrates a charitable donation response form in accordance with one embodiment of the present invention.

DETAILED DESCRIPTION OF THE INVENTION

Figure 1:
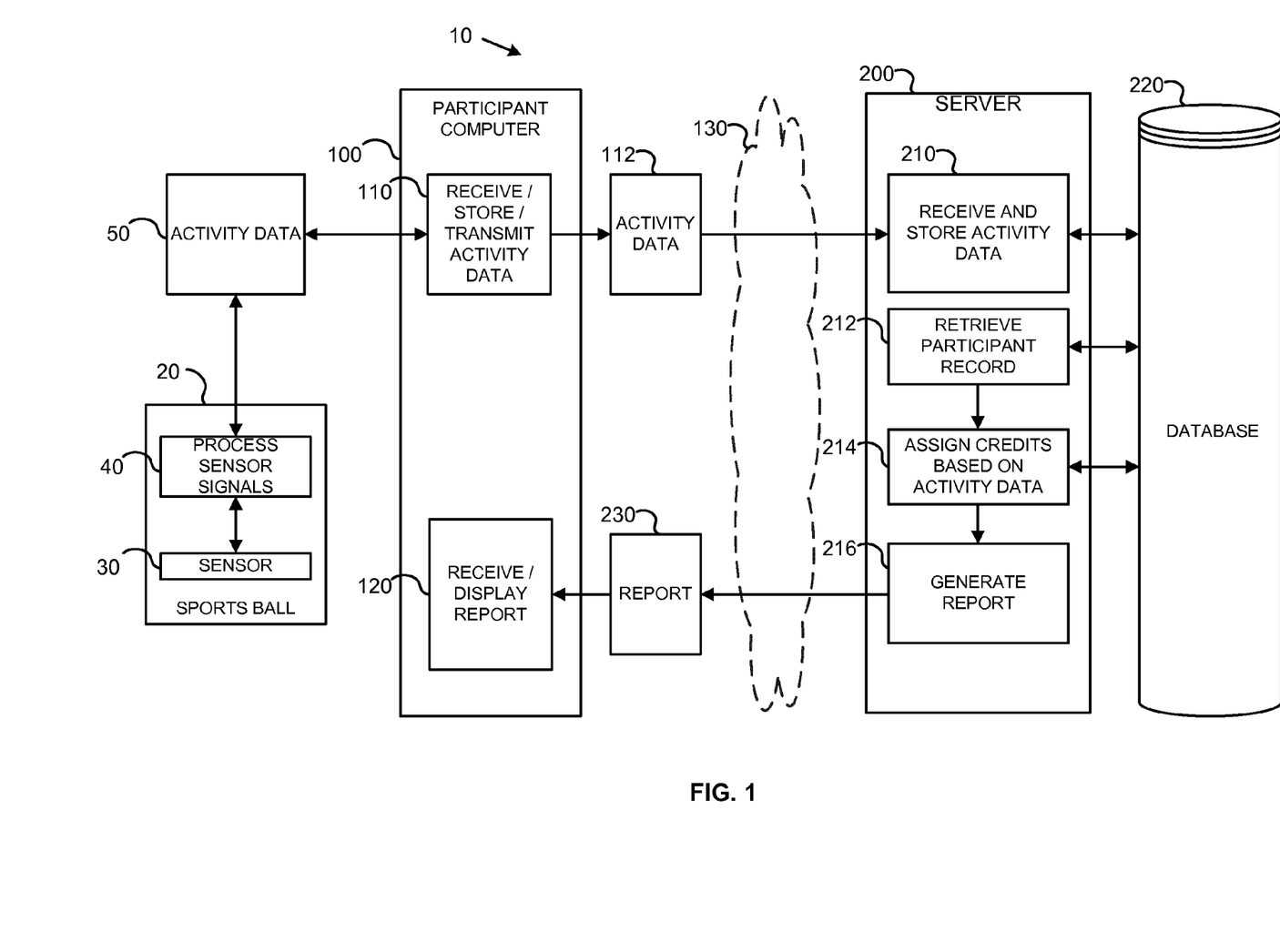
FIG. 1 illustrates a system and method in accordance with one embodiment of the present invention.

FIG. 1 illustrates a system 10 in accordance with one embodiment of the present invention for incentivizing charitable donations based on physical activity. The system 10 includes a server 200 having software executing thereon. The server 200 is in communication with a network 130 via a communication link. The network 130 may be, for example, the internet, an intranet, or some other type of network. A participant computer 100 is in communication with the network 130 and can communicate with the server 200 via the network 130. Although one participant computer 100 is explicitly illustrated in FIGS. 1 and 2, it should be understood that a plurality of participant computers 100 communicate with the server 200 via the network 130. In this way, the server 200 can access and store a plurality of participant records and further provide objective comparisons of the performance of each participant thereby serving, in part, to incentivize charitable giving.

The server 200 may be any type of computer hardware that is configured to execute software and communicate with participant computers 100 and other third parties 249 via the network 130. Although the term server is generally used throughout this disclosure, it is not intended to limit the present invention to a specific type of computer. Moreover, it should be understood that the server 200 may comprise a plurality of computers that communicate via a network. In yet other embodiments, the server 200 may comprise one or more cloud computers, including hardware and software, which are maintained by a third party.

The server 200 is in communication with a participant record database 220. The database 220 is configured to provide storage of information on physical hardware by, for example, executing software on the server 200. The database 220 may take many forms and may be accessible in many different manners. The database 220 allows the server 200 to store information and to retrieve information upon execution of software. The server 200 may be in communication with one or more third parties 249, as is further described below via a network or through some other channel.

During operation of the system 10, the server 200 receives and stores information regarding a participant record. The system 10 is premised on the concept of assigning credits to a participant based on an amount of physical activity that the participant performs. The credits can be redeemed through the system 10 for charitable donations. The participant uses a sports ball for a period of time. As will be disclosed in further detail below, the sports ball tracks and stores data indicative of the duration of the use of the ball. This is referred to activity data. The activity data is transmitted to a participant computer, which in turn is transmitted to the server. Software executing on the server stores the activity data and assigns a number of credits to the participant based on the duration of physical activity.

In the embodiment disclosed in the FIGS., the server 200 hosts a website that is accessible by a plurality of participant computers 100 via the internet 130. The plurality of participant computers 130 can communicate with the server 200 by accessing the webpage hosted by the server 200 via the internet 130. It should be understood that in some embodiments of the present invention, the server 200 comprises a plurality of computers. For example, the server 200 may comprise a first computer for hosting the website, a second computer for performing backend analysis of the participant records, and a third computer for managing storage and access to the data and for communicating with one or more third parties, such as a charitable organization. Although the present invention discloses using an interactive website to facilitate the transfer of information between the server 200 and one or more participant computers 100, the present invention is not limited in this regard. For example, the server 200 and the one or more participant computers 100 may exchange information by electronic mail or by some type of file transfer protocol.

A plurality of participants can access the system 10 via the one or more participant computers 100. The participant computer 100, for example, may include a desktop computer, a laptop, a smart phone, a tablet, or any other processor based device that enables communication via the internet. In some embodiments, the participant computer 100 includes an interface, such as a touch screen, that allows the participant to enter information and instructions into the participant computer 100 and enables the display of information to the participant.

In accordance with one embodiment of the present invention, the system 10 includes a sports ball 20. A sports ball 20 may be a ball having any size and shape that may be used during a physical activity. For example, the sports ball 20 may include, but is not limited to, a soccer ball, a baseball, a football, a golf ball, and a basketball, among others. The terms sports ball is not intended to limit the present invention. As will be appreciated by a person having ordinary skill in the art and being familiar with this disclosure, the present invention may be practiced with other types of equipment used to perform physical activity. For example, the present invention may be practiced using a jump rope, a throwing disc, and a tennis racket, for example.

The sports ball 20 includes a sensor 30 that detects an acceleration of the sports ball 20. The sports ball 20 also includes a processor 40 that is in communication with the sensor 30 so that the processor 40 receives data from the sensor 30 indicative of an acceleration of the sports ball 20. As shown in FIG. 5B, the sensor 30 and the processor 40 are referred to as sensor hardware 42.

As the participant uses the sports ball 20, the ball is subject to a series of accelerations. For example, the ball 20 is kicked, the ball is stopped, and the ball is bounced. Software executing on the processor 40 determines that the sports ball 20 is being used in response to receiving such data and generates activity data 50 indicative of a period of the use of the sports ball. For example, if a participant uses a sports ball 20 for one hour, the activity data 50 will indicate that the ball 20 was used for one hour.

The processor 40 in the sports ball 20 is in communication with the participant computer 100. For example the sports ball 20 and the processor 40 may communicate by wireless or wired transmission such as Bluetooth, wifi, or radio frequency modules. In this manner, the participant can use the participant computer 100 to receive activity data 50 from the sports ball 20 and to further affect data stored in the ball 20 and update software executing on the processor 40. Although the term processor is used herein, the sports ball 20 may comprise a microcontroller or other type of processor based computer having software executing thereon disposed therein.

The participant computer 100 includes software 110 executing thereon to receive the activity data 50 from the sports ball 20. In one embodiment, the participant may open a software application associated with the sports ball 20 on the participant computer 100. This may include, but is not limited to, an application executing on a smart phone. The application may provide an indication that the sports ball 20 is in communication with the participant computer 100 and is ready for an exchange of activity data 50. In another embodiment, the software executing the participant computer 100 may automatically receive the activity data 50 from the sports ball 20. In other embodiments, the software executing on the computer may prompt the participant to initiate the transmittal of activity data 50 from the sports ball 20 to the participant computer 100. In some embodiments of the present invention, software executing on the participant computer 100 stores the activity data 50 in a database associated with the participant computer 100. In one embodiment of the present invention, the participant computer 100 is a smart phone such as an iPhone or an Android phone.

Software 110 executing on the participant computer 100 transmits activity data 50 to the server 200 via the network 130. Software executing on the server 100 receives the activity data 50 associated with the participant and stores the activity data 50 in the database 230. In the embodiment shown, a unique participant identifier is assigned to each participants with access to the server 200. Software executing on the server 200 uses the participant identifier to distinguish and delineate between different participants. The software 210 executing on the server 200 stores the activity data 50 is the database 220 in a participant record associated the participant identifier. The participant record includes all information and data associated with a participant identifier. For example the record may include personal information, charitable goals, past charitable donations, and the duration of use of the sports ball 20. Although an embodiment disclosing a configuration of data stored by the server 200 is disclosed, the present invention is not limited in this regard as other configurations may be used.

Software executing on server 200 assigns credits to each participant record based on the activity data 50 associated with that participant record. Software executing on the server 212 receives a participant record from the database 220. Software executing the server 214 assigns a number of credits to the participant record based on the activity data 50. A person of ordinary skill in the art and familiar with this disclosure will understand that the formula for assigning the credits can vary based on the configuration of the system. For example, one credit will be assigned for each hour of use with the sports ball 20. In other embodiments, different types of physical use can be incentivized by awarding more credits for the same amount of use as compared to as a different type of sports ball. The assigned credits are stored and associated with the participant identifier. In the embodiment shown, the system 10 is configured so a participant earns credits for performing physical activity.

Software executing on the server 216 generates a report 230 based on the assigned credits and transmits that report 230 via the network 130 to the participant computer 100. Software 120 executing on the participant computer 100 receives the report 230. In some embodiments, software 120 executing the participant computer 100 displays the report 230. In reference to FIG. 3, a report 230 in accordance with one embodiment of the present invention is shown. In the embodiment shown, the report 230 is a webpage that is displayed in a browser running on the participant computer 100. The report 230 shows the participant name and displays information regarding the participant's use of the system 10.

Figure 3:
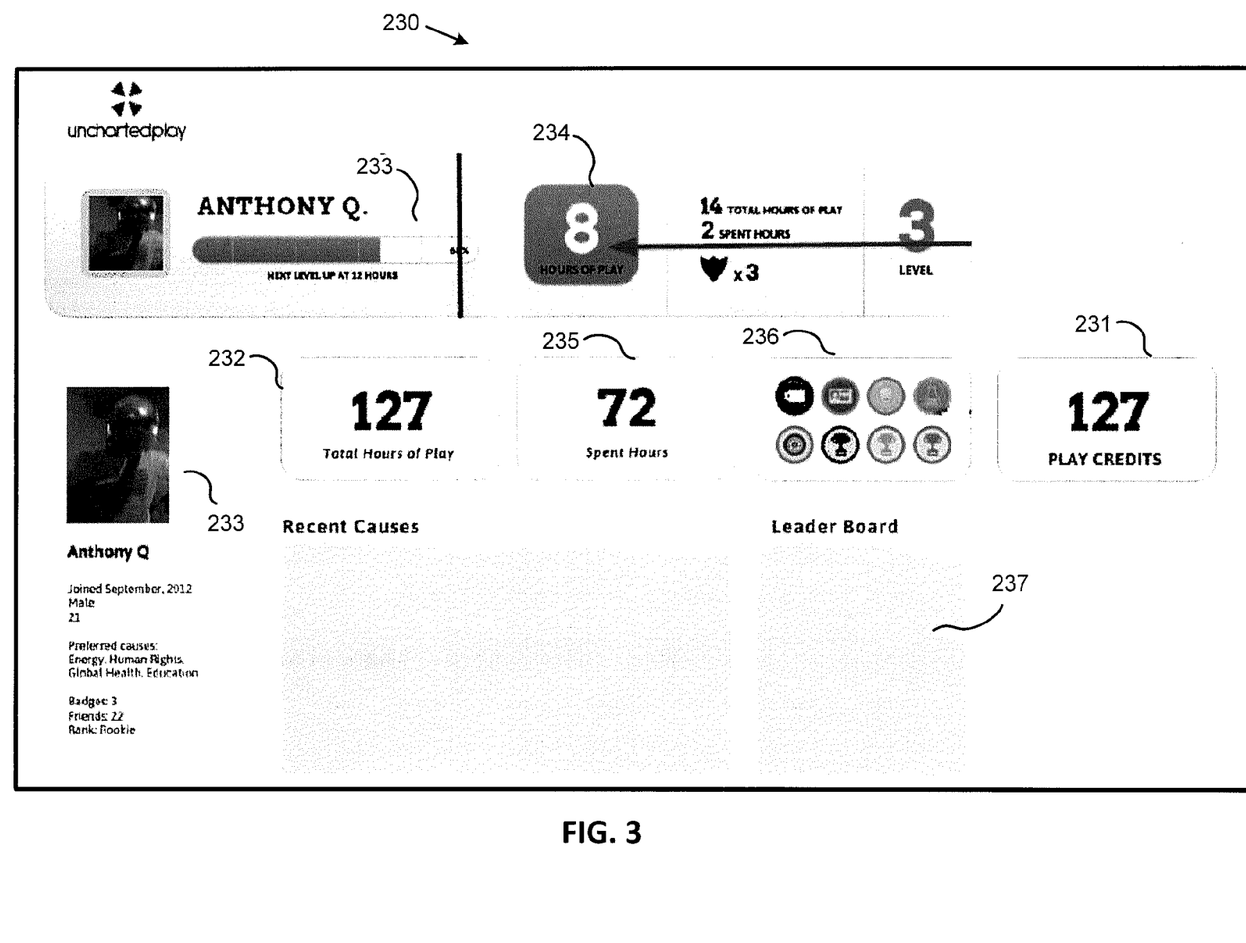
FIG. 3 illustrates a report in accordance with one embodiment of the present invention.

The report 230 displays a number of accumulated credits 231. In the embodiment shown in FIG. 3, the participant "Anthony Q" has earned 127 credits as illustrated by the report 231. The report 230 also includes a leader board 237. The leader board 237 displays a leader in charitable giving in a group. This ranking may be based on any number of factors, for example hours, credits, donation, etc., and the ranking may be among all participants of the system 10 or may be among a sub group using the system 10. The report 230 further includes an avatar 233 chosen by the participant, an identification of the total hours of play 232, and a display of the hours spent on donating to different charitable organizations 335. The report 230 further includes a progress bar 233 that illustrates a participant's progress to a goal, and further illustrates a number of hours of play 234 required to reach a goal. Finally, in the embodiment shown in FIG. 3, the report identifies a number of awards, also referred to as badges, earned by the participant. In some embodiments, the badges are assigned based on the duration of the physical use of the sports ball and the badges can be redeemed for donations. Although a particular embodiment of a report 230 is shown in FIG. 3, the present invention is not limited in that regard. For example, a person of ordinary skill in the art and familiar with this disclosure will understand that the report may take many different forms and may display many different types of data.

The information displayed in the report 230 is stored in the participant record associated with a participant. In some embodiments of the present invention, participants may access software executing on the server 200 by a browser, a cloud application, or by some other method. It some embodiments it is possible for a participant to view records of other participants using the system 10, or at least portions thereof. This sharing of information has been found to further incentivize participation and fundraising.

The system 10 allows a participant to redeem earned credits for charitable donations. For example, one or more third party entities or individuals, for example a corporation seeking to allocate a portion of money to a charitable causes, can sponsor charitable donations made through the system 10. In reference to FIG. 2, software executing on the server receives donation information from one or more third parties 249. For example, a company may pledge $10,000 to be allocated to different donation goals and offered to participants of the system 10. Software 240 executing on the server 200 stores the donation information in the database 220. It should be understood that the present invention is not limited to receiving donation pledges from third parties, and that other funding models may be employed.

Figure 2:
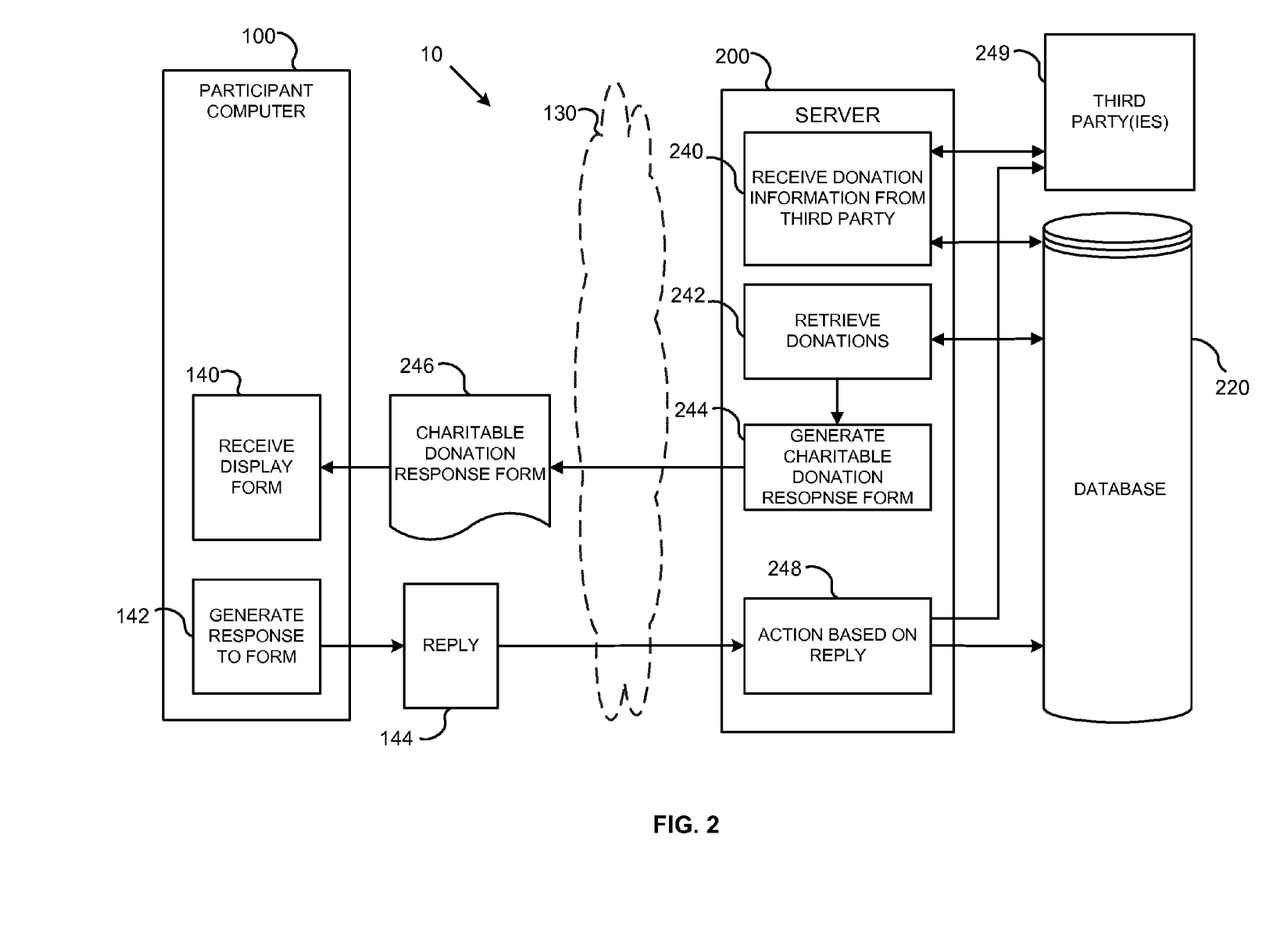
FIG. 2 illustrates a portion of a system and method in accordance with one embodiment of the present invention in which a participant is presented with one or more charitable donation options that are redeemable for assigned credits.

The charitable donation options may be displayed to the participant so that the participant can redeem credits. Software executing on the server 242 retrieves donation information from the database 220. Software 244 executing on the server 200 generates a charitable donation response form 246 and transmits the form 246 to a participant computer 100 via the network 130. Software 140 executing on the participant computer 100 receives and displays the charitable donation response form 246.

In reference to FIG. 4, a charitable donation response form 246 in accordance with one embodiment of the present invention is shown. The response form 246 identifies a number of available credits 215. The form 246 also displays different charitable donation options. For example, the form 246 displays a schools and recreation donation option 214, a water and agriculture donation option 213, a livelihood and vocation option 212, and a global health option 211.

Through the participant computer 100, the participant can select a charitable donation option presented on the form 246. Based on the selection, software 142 executing on the participant computer 100 generates a reply 144 to the form 246 and transmits the reply 146 to the server 200. Software executing on the server 200 receives the reply 144 and updates the participant record accordingly. Software executing on the server 200 may further generate one or more instructions, for example to make the donation, and transmit that instruction to one or more third parties 249.

In reference to FIG. 5B, sensor hardware 22 for use with the sports ball 20 in accordance with one embodiment of the present invention is shown. The sensor hardware 22 includes a sensor 30, a microcontroller 40, and a transmitter 42. The microcontroller 40 is a processor based computer, and may also be referred to herein as a processor. The sensor hardware 22 also includes a battery (not shown in FIG. 5B). In the embodiment shown, the sensor 30 is a piezoelectric component. As the ball 20 is accelerated, it vibrates the piezoelectric component, which generates an electrical current therein. The change in the piezoelectric element is detected by the microcontroller 40. Software executing on the microcontroller 40 can determine whether the ball 20 is being used in a physical activity based on the received signal. If that software executing on the microcontroller 40 determines that physical activity is occurring, the microcontroller begins logging this use until it is stopped, thus determining activity data 50. The microcontroller 40 stores the activity data so that it can be later transmitted to the participant computer 100.

In the embodiment shown, the microcontroller 40 is an Arduino Fio Microcontroller Board, although the present invention is not limited in this regard. The sensor hardware 22 includes a wireless transceiver 42 that is in communication with the microcontroller 40. The wireless transceiver 42 is used to transmit the activity data 50 to the participant computer 100. It should be understood, however, that the present invention is not limited in this regard, and that there are many different ways in which the activity data can be transmitted between the sports ball 20 and the participant computer 100. For example, the sports ball 20 may include a removable drive, or the data may be transmitted by a hard wire connection. It should also be understood that the present invention is not limited to the sensor hardware 22 disclosed herein, for example the piezoelectric component 30 and the microcontroller 40. A person of ordinary skill in the art and familiar with this disclosure will understand that other types of hardware capable of detecting and logging use of the sports ball 20 may be used with the present invention.

Figure 6:
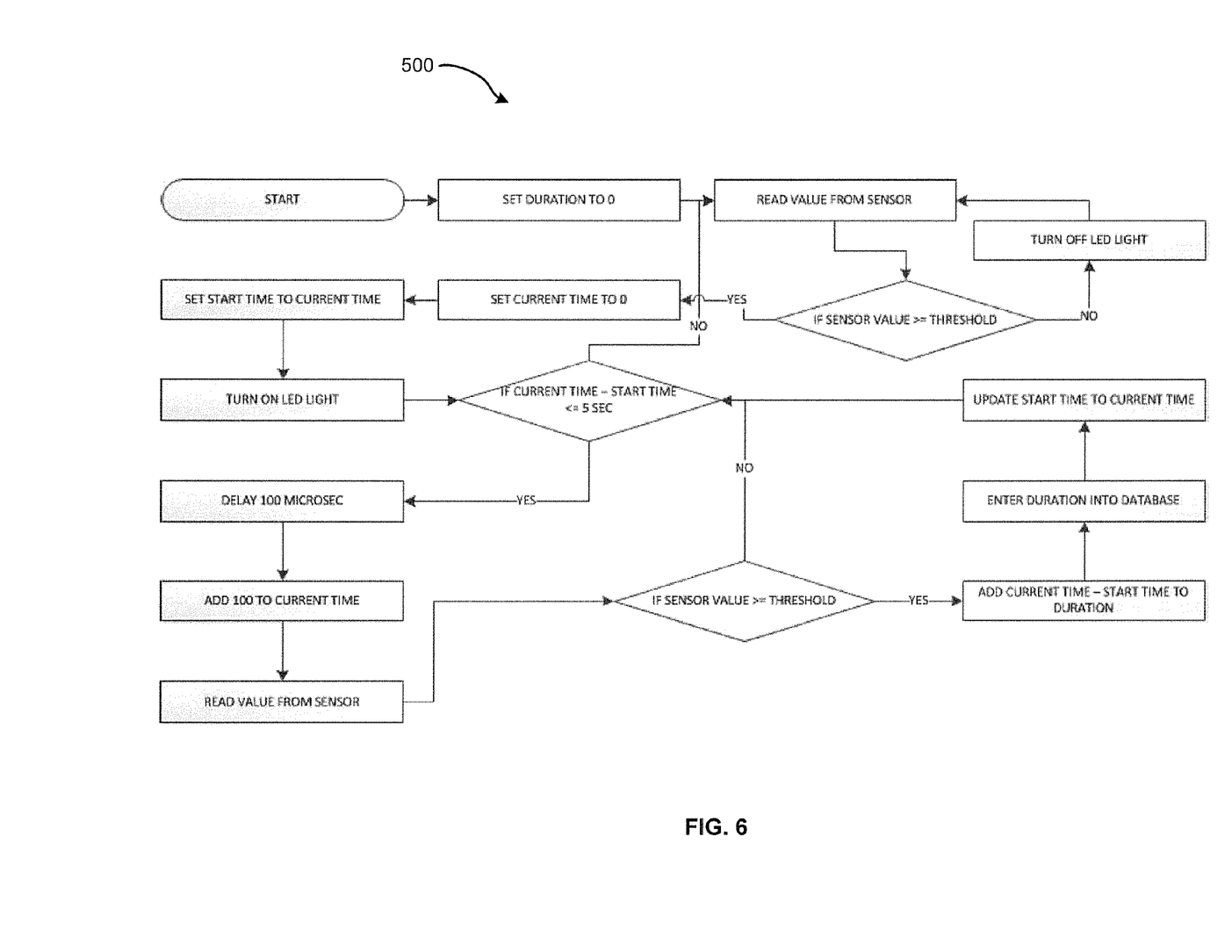
FIG. 6 is a flow diagram illustrating the control logic for use with the microprocessor shown in FIG. 5B in accordance with one embodiment of the present invention.

In reference to FIG. 6, the microcontroller 40 includes software executing thereon for determining whether changes in a signal received from the piezoelectric element is evidence of physical use and for determining when to start and stop logging based on intervals between received signals indicating physical use. The control logic 500 is illustrated in FIG. 6. This logic 500 facilitates tracking of physical activity because it enables the sensor hardware 22 to distinguish between periods of no acceleration during physical use of the ball and periods of no acceleration when the sports ball is not be used at all. In this manner, the sensor hardware can accurately track use of the ball. The sensitivity of the sensor hardware can be affected by adjusting the threshold value in the control logic. Although a specific logic is illustrated herein, for example in FIG. 6, a person of ordinary skill in the art will understand that the present invention is not limited in this regard. In a different embodiment, the activity data 50 can be used to extrapolate/estimate the amount of kinetic energy generated by the ball, either represented in Watts or in minutes of light.

In some embodiments of the present invention, an energy generation module is included in the sports ball 20 to generate electric energy for the microprocessor 40 and the wireless transmitter 42 that are included in the sports ball 20. Such an energy generation module is disclosed U.S. Patent Publication US20130023365 and titled Energy Storing Device and Method of Using the Same. That disclosure is incorporated herein by reference. It should be understood, however, that the present invention is not limited in this regard, as a battery or other source of electrical energy may be used to power the sensor hardware 22.

Figure 7:
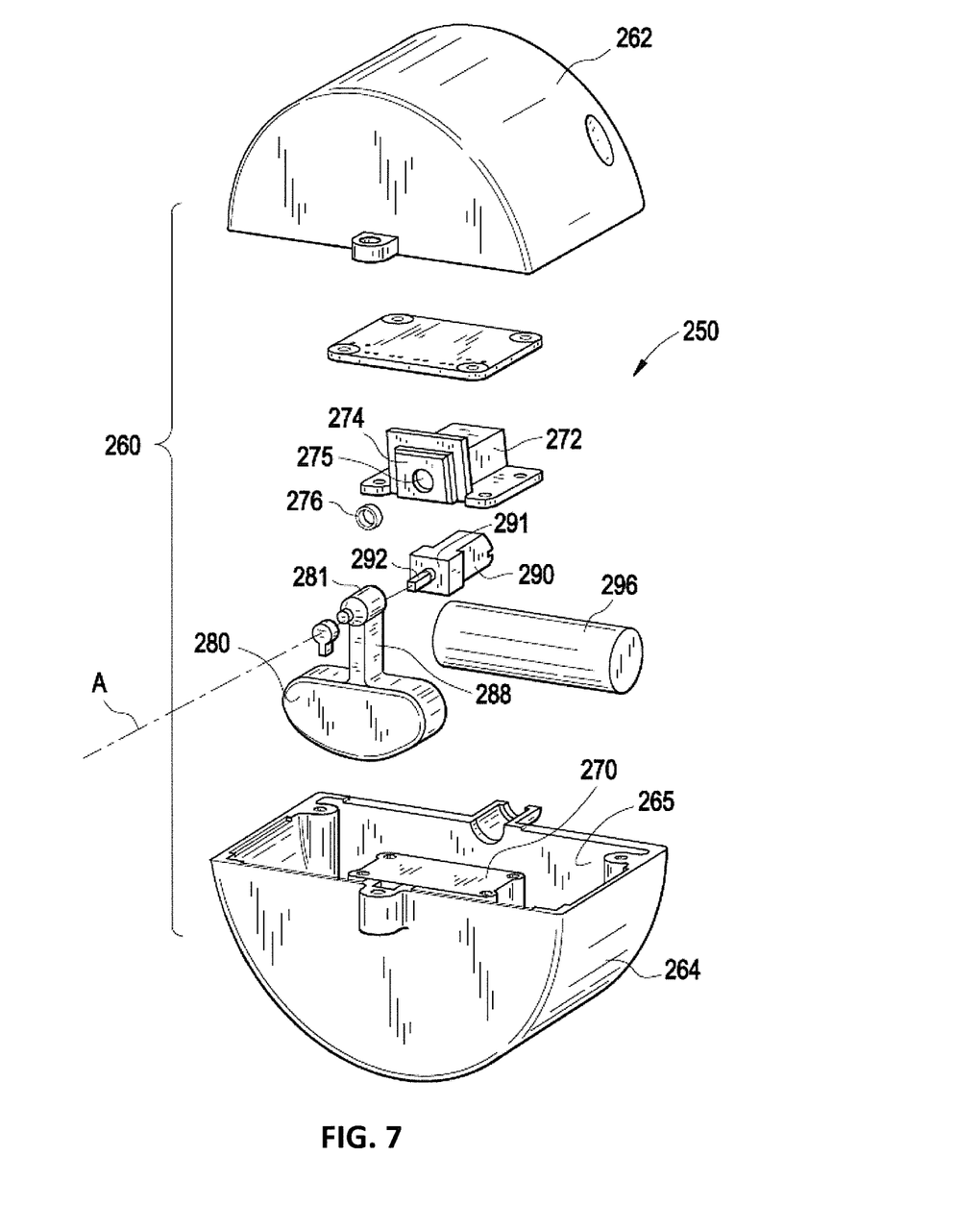
FIG. 7 is an exploded perspective view of a generation module in accordance with one embodiment of the present invention.

In reference to FIG. 7, an exploded view of a generation module 250 in accordance with one embodiment of the present invention in shown. The generation module 250 includes a housing 260, a pendulum 280, an electric generator 290, a battery 296, and supporting hardware including one or more brackets and fasteners as discussed in detail below. The housing 260 includes a first section 262 and a second section 264. The electric generator 290 is mounted on pedestal 270 extending from an inner surface 265 of the second section 264 of the housing 260. A U-shaped bracket 272 is mounted over the electric generator 290 and to the pedestal 270 using a plurality of fasteners (not shown in the FIG. 7) to secure the electric generator 290 to the pedestal 270. The electric generator 290 includes a rotor 292 extending from a surface 291 of the electric generator 290.

The pendulum 280 rotates about a first axis of rotation A at or proximate to a proximal end 281 of the pendulum 280. The first axis of rotation A of the pendulum 280 is perpendicular to a rod 288 of the pendulum 280. The pendulum 280 includes a recess (not shown in the figures) proximate to the proximal end 281 for receiving the rotor 292 of the electric generator 290. The recess is configured so that when the rotor 292 is received therein an axis of rotation of the rotor is coaxial with the first axis of rotation A. The rotor 292 may be secured in the recess of the pendulum 280 by any known method, including by a press-fit, an adhesive, or by a mechanical fastener. The rotor 292 is inserted through an opening 275 in a faceplate 274 of the U-bracket 272 and through a washer 276 before being inserted into the recess of the pendulum 280. The faceplate 274 and the washer 276 serve to maintain the pendulum 280 rotating about a single axis of rotation, the first axis of rotation A, regardless of the axis(es) of rotation of the ball. The faceplate 274 further inhibits radial forces from being transferred from the pendulum 280 to the electric generator 290 along the rotor 292.

Figure 8A:
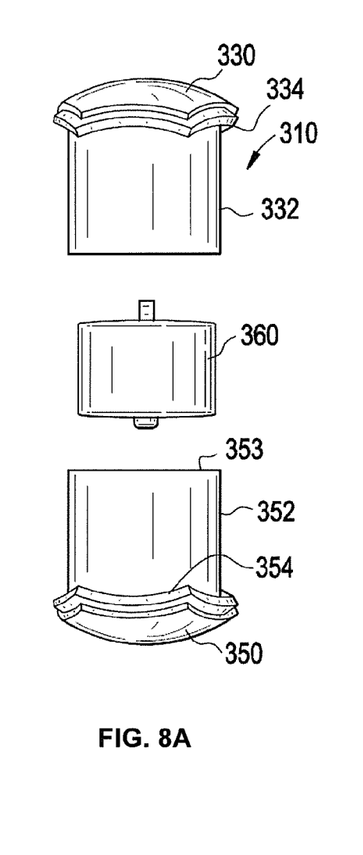
FIG. 8A is an exploded view of portion of a sports ball in accordance with one embodiment of the present invention.
Figure 8B:
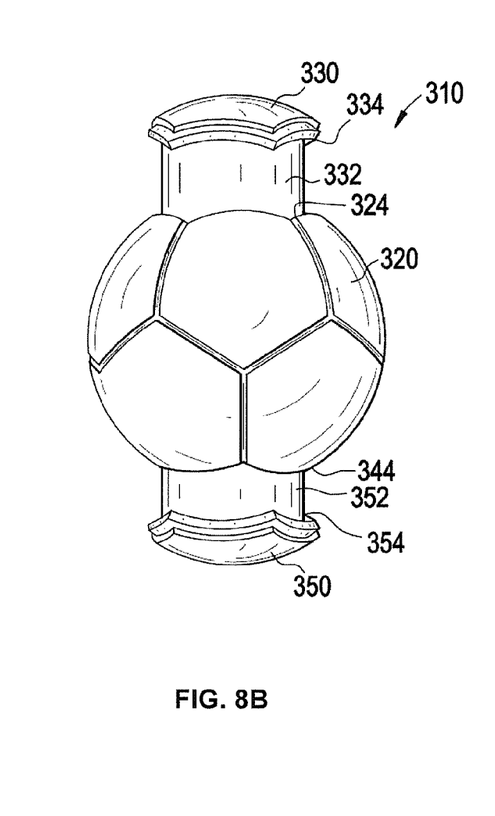
FIG. 8B is an exploded view of the sports ball shown in FIG. 8A.
Figure 8C:
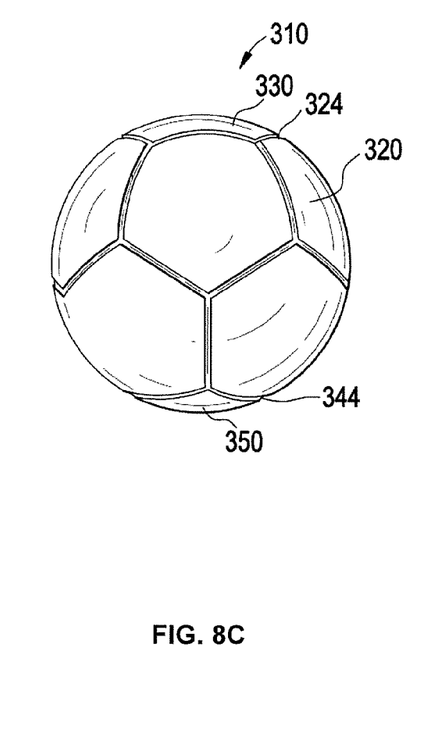
FIG. 8C is a view of the ball shown in FIGS. 8A and 8B.

In reference to FIGS. 8A-8C, a ball 310 in accordance with one embodiment of the present invention is shown. The ball 310 includes a generally spherical shell 320 that defines a cavity. The ball 310 includes a generation module 360 that harnesses kinetic energy of the ball 310 to generate and store electrical energy. It should be understood that in the embodiment shown in FIGS. 8A and 8B, the sensor hardware 22 is disposed in the generation module 360. The shell 320 defines a first opening 324 for accessing the cavity and includes a first panel 330 for substantially closing the first opening 324. The first panel 330 includes a cylindrical sleeve 332 that extends radially inward from an inner surface 334 of the first panel 330. The shell 320 defines a second opening 344 for accessing the cavity and includes a second panel 350 for substantially closing the second opening 344. In the embodiment shown, the second opening 344 is substantially opposite the first opening 324 in the shell 320. The second panel 350 includes a cylindrical sleeve 352 that extends radially inward from an inner surface 354 of the second panel 350.

During assembly the generation module 360 and the sensor hardware 22 is secured in one or more of the first sleeve 332 and the second sleeve 353. In some embodiments, the sensor hardware 22 is disposed in the case of the generation module. The first panel 330 and the second panel 350 are secured in the respective first opening 324 and second opening 344 so that the first sleeve 332 and the second sleeve 352 are disposed in the cavity. In some embodiments, the first sleeve 332 is adapted to receive a distal portion 353 of the second sleeve 352 when the first sleeve 332 and the second sleeve 352 are fully inserted into the shell 320 thereby increasing the rigidity of the assembled ball 310. In yet other embodiments, a portion of the generation module 360 is received in the first sleeve 332 and a portion of the generation module is received in the second sleeve 352 when the first sleeve and the second sleeve are fully inserted into the shell 320 thereby increasing the rigidity of the assembled ball 310. One of the first and the second panel 330, 350 includes an opening for an outlet, however, the present invention is not limited in this regarding as there may be more than one outlet or no outlets.

Figure 5A:
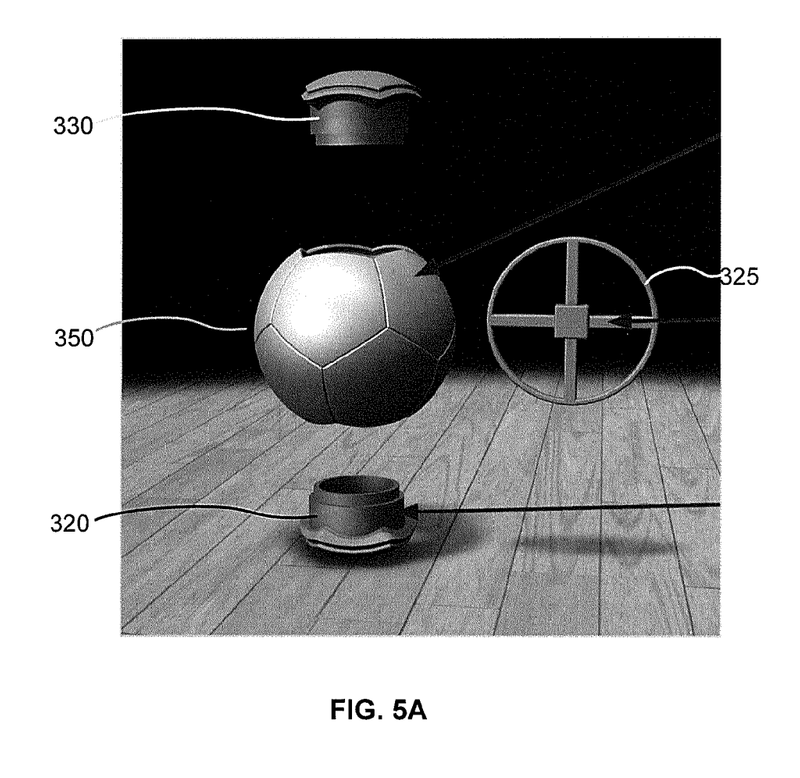
FIG. 5A is an exploded view of a sports ball in accordance with one embodiment of the present invention.
Figure 5B:
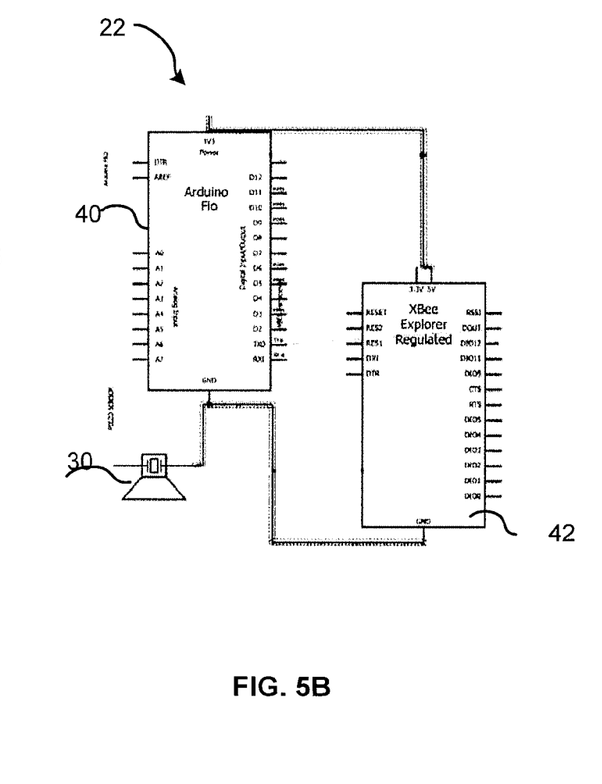
FIG. 5B is a schematic of a microprocessor, sensor, and transmitter in accordance with one embodiment of the present invention.

In reference to FIG. 5A, another embodiment of a ball 20 in accordance with one embodiment of the present invention is shown. The ball 20 includes a first panel and a second panel 320, 330. The ball 20 further includes a ring structure 325. The ring 325 is supported between the distal ends of the two panel 320, 330 so that the sensor hardware 42 is disposed substantially in the center of the ball 20. The ring 325 further serves to provide additional support to the ball. In yet another embodiment of the present invention, the sensor hardware 22 is disposed in soft foam which in turn is disposed in the cavity a shell defining a spheroid. In this embodiment, the foam maintains the position of the sensor hardware 22 in the sports ball 20. It should be understood to a person of ordinary skill in the art, that while certain specific configurations are disclosed relating to the configuration position of the sensor hardware relative to the ball, the present invention is not limited in this regard and that different options may be used.

Although the present invention has been disclosed and described with reference to certain embodiments thereof, it should be noted that other variations and modifications may be made, and it is intended that the following claims cover the variations and modifications within the true scope of the invention.

What is claimed is:

1. A system for incentivizing charitable giving based on physical activity, comprising:
    a computer associated with a first participant identifier and having a communication link with the internet;
    a sports ball associated with the first participant identifier, the sports ball comprising:
        a sensor for detecting an acceleration of the sports ball;

a processor in communication with the sensor, so that software executing on the processor receives signals from the sensor indicative of an acceleration of the sports ball;

software executing on the processor for determining activity data based on the signals received from the sensor;

a communication link between the sports ball and the computer;

software executing on the computer associated with the first participant identifier for receiving first participant activity data indicative of a duration of the use of the sports ball;

software executing on the computer associated with the first participant identifier for transmitting first participant activity data via the communication link with the internet;

a server having a communication link with the internet;

software executing on the server for receiving the first participant activity data;

a database comprising a plurality of participant records, each participant record having a participant identifier associated therewith;

software executing on the server for storing the received first participant activity data, indicative of a duration of the use of the sports ball, in a participant record associated with the first participant identifier;

software executing on the server for assigning a plurality of credits to the participant record associated with the first participant identifier based on the activity data stored in the participant record associated with the first participant identifier;

software executing on the server for generating a report based on the credits assigned to the participant record associated with the first participant identifier;

a communication link between the server and the internet;

software executing on server for transmitting the report to a participant computer associated with the first participant identifier via the communication link;

wherein the ball comprises a shell defining a spheroid, the shell defining a cavity;

wherein the shell defines a first opening and a second opening substantially diametrically opposite the first opening, a first panel configured to substantially close the first opening, the first panel having a sleeve extending radially inward from an inner surface thereof;

a second panel configured to substantially close the second opening, the second panel having a sleeve extending radially inward from an inner surface thereof;

wherein the sensor and the processor are supported in a center of the sphere by a distal end of the first sleeve and a distal end of the second sleeve.

2. The system of claim 1 wherein the sensor comprises a piezoelectric component that generates an electrical current in response to an acceleration of the sports ball.

3. The system of claim 1, wherein the ball further comprises a foam ring disposed therein between the distal end of the first sleeve and the distal end of the second sleeve, the foam ring being configured to further support the sensor and the processor.

4. The system of claim 3, wherein the ball further comprises a pendulum, an electric generator, and a battery disposed in the housing, a rotor of the electric generator being mechanically coupled to the pendulum at a first axis of rotation of the pendulum, the electric generator being electrically coupled to the battery;

wherein an acceleration of the ball relative to a playing surface causes the pendulum to rotate about the first axis of rotation;

wherein the rotation of the pendulum rotates the electric generator which generates electrical energy at least a portion of which is stored by the battery.

5. The system of claim 1, further comprising:

software executing on the server for generating a donation response form, the form identifying at least one donation option redeemable for a predetermined number of credits;

software executing on the server for receiving a reply to the charitable donation response form.

6. The system of claim 5, further comprising:

software executing on the server for subtracting credits corresponding to the predetermined number of credits from the total number of credits associated with the participant record associated with the first participant identifier in response to a selection of the first donation option.

7. The system of claim 6, further comprising:

software executing on the server for generating a donation redemption form that includes a confirmation that the donation has been redeemed.

8. The system of claim 7, wherein the report includes a rank associated with the first participant identifier, the rank being indicative of the duration of use with the sports ball associated with the first participant identifier relative to the duration of use of sports balls associated with one or more other participant identifiers.

9. The system of claim 8, wherein the report identifies a duration of use of the sports ball associated with the first participant identifier and wherein the report identifies a number of credits corresponding to a period of use of the sports ball.

* * * * *